United States Patent [19]
Kikuta et al.

[11] Patent Number: 5,872,949
[45] Date of Patent: Feb. 16, 1999

[54] APPARATUS AND METHOD FOR MANAGING DATA FLOW DEPENDENCIES ARISING FROM OUT-OF-ORDER EXECUTION, BY AN EXECUTION UNIT, OF AN INSTRUCTION SERIES INPUT FROM AN INSTRUCTION SOURCE

[75] Inventors: Betty Yooko Kikuta, Mountain View, Calif.; Terence Matthew Potter, Austin, Tex.

[73] Assignees: International Business Machines Corp., Armonk, N.Y.; Motorola, Inc., Schaumburg, Ill.

[21] Appl. No.: 748,459

[22] Filed: Nov. 13, 1996

[51] Int. Cl.[6] ............................... G06F 9/00; G06F 9/22; G06F 9/30

[52] U.S. Cl. .................... 395/392; 395/391; 395/393; 395/394; 395/800.23

[58] Field of Search .................... 395/390–394, 395/800.23, 800.32

[56] References Cited

U.S. PATENT DOCUMENTS

| | | | |
|---|---|---|---|
| 5,467,473 | 11/1995 | Kahle et al. | 395/800.23 |
| 5,481,683 | 1/1996 | Karim | 395/393 |
| 5,535,346 | 7/1996 | Thomas, Jr. | 395/393 |
| 5,559,976 | 9/1996 | Song | 395/391 |
| 5,625,789 | 4/1997 | Hesson et al. | 395/393 |
| 5,694,553 | 12/1997 | Abramson et al. | 395/800.23 |

FOREIGN PATENT DOCUMENTS

0 649 085  4/1995  European Pat. Off. .

*Primary Examiner*—Parshotam S. Lall
*Assistant Examiner*—Bharat Barot
*Attorney, Agent, or Firm*—Morgan & Finnegan, L.L.P.

[57] ABSTRACT

An apparatus and method to manage data flow dependencies so that a processor can complete instructions and write associated data to architected logical registers out of the program order. This increases the commission bandwidth of the processor allowing greater processor throughput, by allowing instructions to pass the completion stage prior to having produced data.

11 Claims, 8 Drawing Sheets

APPARATUS AND METHOD FOR MANAGING DATA FLOW DEPENDENCIES ARISING FROM OUT-OF-ORDER EXECUTION, BY AN EXECUTION UNIT, OF AN INSTRUCTION SERIES INPUT FROM AN INSTRUCTION SOURCE

FIELD OF THE INVENTION

The invention disclosed broadly relates to computer systems and methods and more particularly relates to improvements in data dependency handling in superscaler microprocessors.

BACKGROUND OF THE INVENTION

It is a goal of microprocessor design to execute as many instructions per unit time as possible. This goal is furthered by processing multiple instructions from an instruction sequence in parallel and out of order when speed efficiency is gained thereby. Processors having this capability are known in the art as superscaler microprocessors.

Instruction sequences typically contain instructions, produced by a programmer, specifying operations to be performed on operands, and specifying an architected logical register into which to store a result. The operands themselves may be specified as being the contents of particular architected logical registers or constants. Inherent to the instruction sequence are data and control dependencies. For example, later instructions may depend on data produced by an earlier instruction. Therefore, to execute the instruction sequence out of order, the data and control dependencies must be managed. Otherwise, incorrect results will be produced.

In the case of branch instructions in the instruction sequence, or other instructions which cause exceptions or interrupts, the processor must be able to determine the correct "machine state" of the superscaler processor at a given place in the instruction sequence. The machine state is the state of all registers defined to software programmers, which includes the architected logical registers. Following is an example illustrating an exception in a program sequence. Assume that an instruction, situated later in the program sequence than the instruction producing the exception, executed first and wrote data to a register. The data written would not be valid, because the machine state of the processor must be determined based on instructions prior to the exception in the program sequence. Thus, the data produced by all instructions subsequent to the exception must be disregarded, and the state of all architected logical registers must be determined.

In prior art microprocessors, the integrity of data and control flow of an instruction sequence was maintained during out of order execution of instructions by completing the instructions in the program sequence. Results from instructions were temporarily stored in rename registers, and subsequently the results were written back into fixed architected logical registers in the program order. Thus, the fixed architected logical registers always contained the correct machine state of the processor.

A consequence of having to complete instructions in the program order is that instructions that take multiple cycles to execute will cause a bottleneck to occur at the instruction completion stage. Subsequent instructions will not be able to complete or write data until the multiple-cycle instruction completes. Depending on the number of cycles that it takes for the multiple-cycle instruction to execute, the bottleneck can prevent the processor from fetching and processing new instructions, thus reducing the processor throughput.

In order to avoid bottleneck problems associated with the completion of instructions in the program order, a distributed mechanism for handling control-flow dependencies has been disclosed in co-pending U.S. patent application Ser. No. 08/377,813, filed Jan. 25, 1995, now abandoned, and is hereby incorporated by reference. Data dependencies, which also have to be managed in order to allow instruction results to be written out of order, and to maintain the correct machine state of the processor, are revealed in this disclosure.

SUMMARY OF THE INVENTION

The present invention introduces an apparatus and method for managing data flow dependencies so that a processor can complete instructions and write associated data to architected logical registers out of the program order. This increases the commission bandwidth of the processor allowing greater processor throughput, by allowing instructions to pass the completion stage prior to having produced data.

The invention comprises an apparatus and method for managing data-flow dependencies arising from out-of-order execution of an instruction series. It comprises a plurality of physical rename registers, storing results produced during execution of an instruction series.

A look ahead state buffer is used for storing the addresses of the physical rename registers, thus indicating current assignments to architected logical registers specified in the instruction series.

A state history buffer is coupled to the look ahead state buffer, and stores a plurality of linked lists of the physical rename registers' addresses successively assigned to each of the architected logical registers in the look ahead state buffer. The state history buffer, furthermore, has changeable status bits indicating the state of data in each of the physical rename registers.

BRIEF DESCRIPTION OF THE FIGURES

These and other objects, features, and advantages will be more fully appreciated with reference to the accompanying drawings.

DETAILED DESCRIPTION

Figure 1:
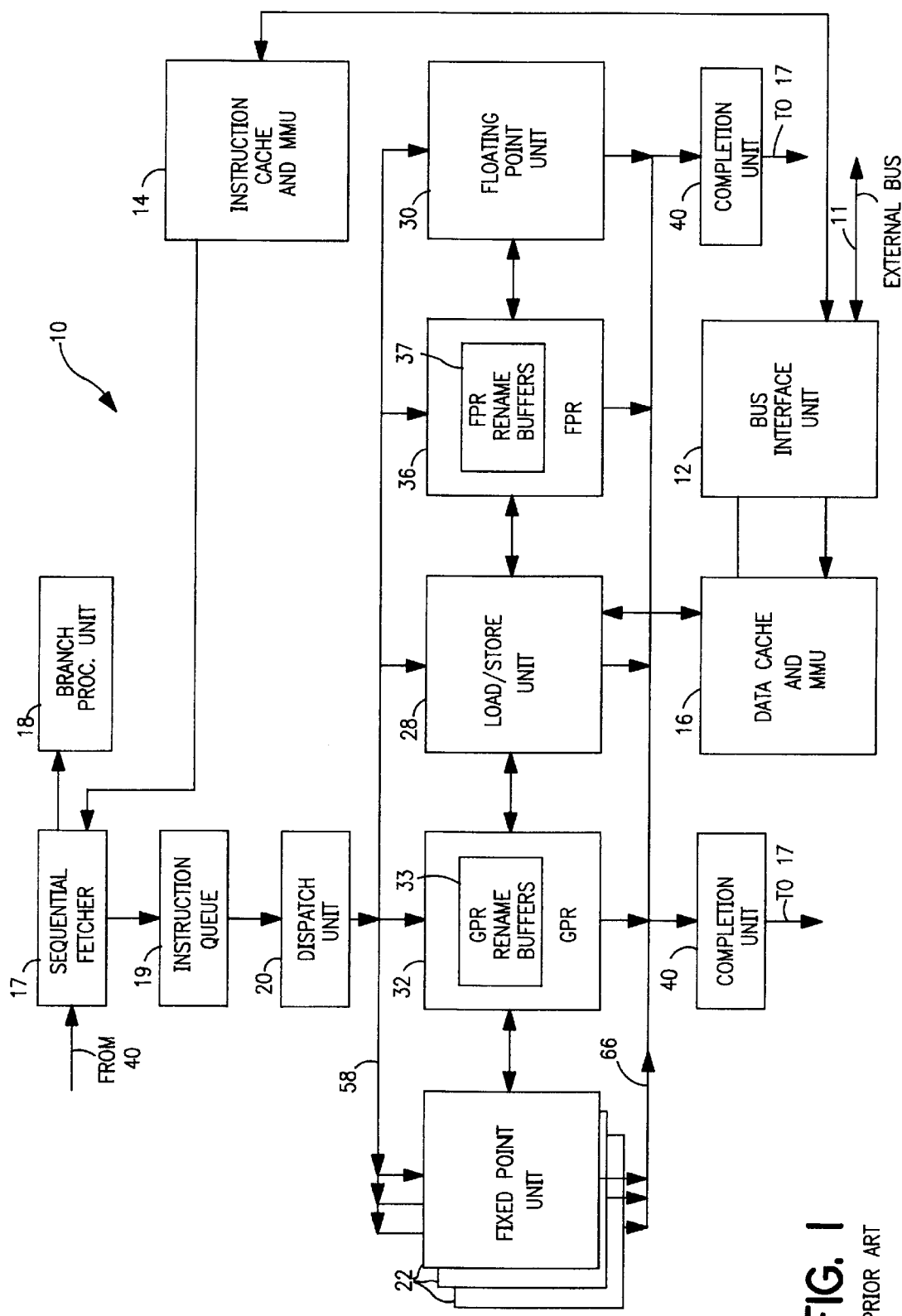
FIG. 1 is a functional block diagram of a multiple execution unit superscaler processor of the prior art.

FIG. 1 shows an overall functional block diagram of a multiple execution unit processor of the prior art. An example of a computer having such an architecture is the "PowerPC(tm) 603", which is described in the "PowerPC 603 RISC Microprocessor User's Manual", published by IBM Microelectronics and Motorola, publication number MPC603UM/AD, copyright 1994. The superscaler processor 10 includes an instruction unit portion including a sequential fetcher 17, a branch processing unit 18, an instruction queue 19, a dispatch unit 20, and an instruction cache and memory management unit (MMU) 14. The instruction cache and MMU 14 is connected to the bus interface unit 12 which in turn is connected to the external bus 11. The instruction unit portion provides centralized control of instruction flow to the execution units.

The execution units include multiple fixed point units 22, the general purpose register file 32, the load/store unit 28, the floating point register file 36, and floating point unit 30.

A data cache and memory management unit (MMU) 16 is connected to the load/store unit 28, and is also connected to the bus interface unit 12.

The fixed point units 22 execute integer instructions in parallel. Some integer instructions execute in one cycle. Other integer instructions require multiple processor clock cycles during which to complete.

GPR rename buffers 33 are shown associated with the GPR file 32 in FIG. 1, and FPR rename registers 37 are shown associated with the floating point register file 36 of FIG. 1.

The sequential fetcher 17 fetches the instructions from the instruction cache 14 and places them into the instruction queue 19. The branch processing unit 18 extracts branch instructions from the sequential fetcher 17 and uses static branch prediction on unresolved conditional branches to allow the fetching of instructions from a predicted target instruction stream while a conditional branch is evaluated. Instructions to be executed by the floating point unit 30, the fixed point units 22, and the load/store unit 28 are dispatched by the dispatch unit 20.

The instruction queue 19 holds instructions for later dispatch. The sequential fetcher 17 continuously loads as many instructions as space allows in the instruction queue 19. Instructions are dispatched to their respective execution units from the dispatch unit 20. Typical dispatch rates are two or four instructions per cycle. The dispatch unit 20 performs source and destination register dependency checking, determines dispatch serializations, and inhibits instruction dispatching as required. Most integer instructions are single cycle instructions. Any stalling due to contention for GPR registers 32 is minimized by the automatic allocation of rename registers 33. The system writes the contents of the rename registers 33 to the appropriate GPR register 32 when integer instructions are retired by the completion unit 40.

The load/store unit (LSU) 28 executes all load/store instructions and provides the data transfer interface between the GPR's 32, the FPR's 36, and the cache/memory subsystems 14 and 16. The load/store unit 28 calculates effective addresses, performs data alignment, and provides sequencing for load/store string and multiple instructions.

The completion unit 40 tracks instructions from their dispatch by the dispatch unit 20 through execution by the respective execution unit, such as the fixed point unit 22. The completion unit then retires or completes the instruction in program order.

The multiple execution unit parallel processing system shown in FIG. 1 is a pipelined superscaler processor in which the processing of an instruction is reduced into discrete stages. Because the processing of an instruction is broken down into a series of stages, an instruction does not require the entire resources of an execution unit, such as the fixed point unit 22. For example, after an instruction completes the decode stage, it can pass on to the next stage, while a subsequent instruction can advance into the decode stage. This improves throughput of the instruction flow.

The instruction pipeline has four major pipeline stages. The fetch pipeline primarily involves retrieving instructions from the memory system and determining the location of the next instruction fetch. Additionally, the branch processing unit decodes branches during the fetch stage. The dispatch pipeline stage is responsible for decoding instructions supplied by the instruction fetch stage and determining which of the instructions are eligible to be dispatched in the current cycle. In addition, the source operands of the instructions are read from the appropriate register file and dispatched with the instruction to the execute pipeline stage. At the end of the dispatch pipeline stage, the dispatch instructions and the operands are latched by the appropriate execution unit.

During the execute pipeline stage, each execution unit that has an executable instruction, executes the selected instruction, writes the instruction's result in the appropriate rename register, and notifies the completion stage 40 that the instruction has finished execution. The complete/write-back pipeline stage maintains the correct architectural machine state by writing back the contents of the rename registers to the GPR's and FPR's as instructions are retired in the order of the program.

Figure 2:
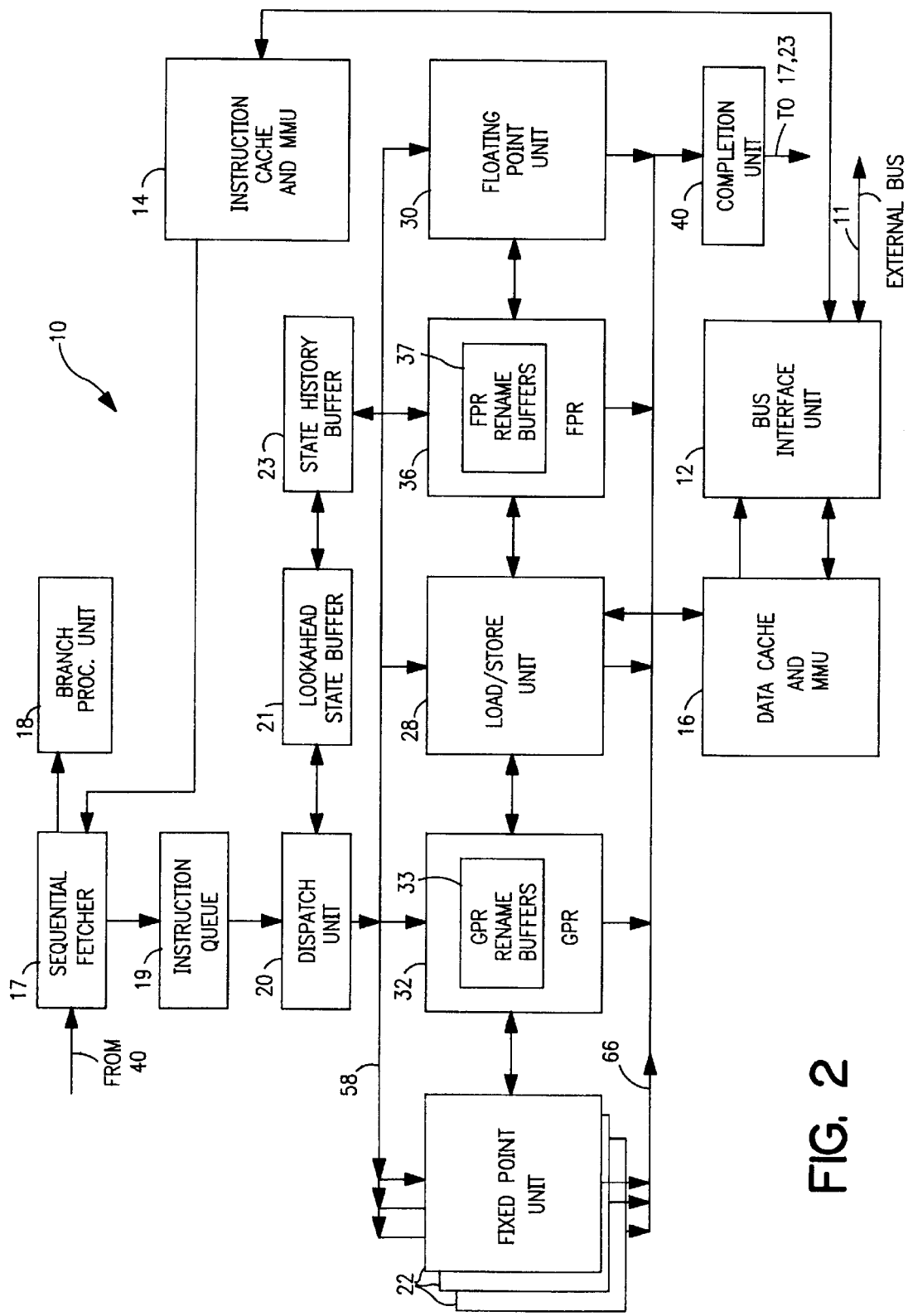
FIG. 2 is a functional block diagram of a multiple execution unit parallel processor incorporating the present invention.

FIG. 2 shows a functional block diagram of a superscaler microprocessor, in accordance with the present invention. The dispatch unit 20 is coupled to a look ahead state buffer 21, which in turn is coupled to a state history buffer 23. The state history buffer 23 is coupled to the look ahead state buffer 21, the result bus 66, and the completion unit 40.

The look ahead state buffer 21 comprises a set of look ahead registers, each register corresponding to an architected logical register defined to a computer programmer. Each of the look ahead registers then stores an address of a physical rename register 39, which indicates the most current location of the value of the architected logical register.

The state history buffer 23 keeps track of the machine state of the superscaler processor 10. It comprises a set of state history registers, each state history register corresponding to one of the physical rename registers in the general purpose register 32 and floating point register 36. The state history buffer 23 uses its register set to store a set of linked lists of physical rename register assignments, made to each architected logical register, during instruction processing. In addition, the state history buffer 23 comprises status bits or flags 52 which indicate the status of each physical rename register in the register set. These status bits 52 indicate to other units of the microprocessor 10 when a physical rename register 39 contains a value that is "committed". Committed is defined in co-pending application Ser. No. 08/377,813, filed Jan. 25, 1995, now abandoned, and is here defined to mean the point after which in instruction is guaranteed to execute. The status bits 52 also indicate when a physical rename register 39 is free and therefore capable of being allocated to represent an architected logical register. The status bits 52 also indicate when a physical rename register 39 has been written and therefore contains a valid result.

Just as in the prior art microprocessor 10 of FIG. 1, the dispatch unit 20 dispatches instructions to available execution units. However, when an instruction specifies an architected logical register into which to store a result, the dispatch unit 20 checks the status bits 52 of the state history buffer 23 to determine which physical rename register 39 is available for allocation. The dispatch unit 20 then allocates a physical rename register 39 by updating the status bits 52 of the state history buffer, store the address of the physical rename register 39 in the look ahead state buffer 21 indicating the current architected register to physical rename register correspondence, dispatch the instruction to an execution unit for execution, and store the address of the current physical rename register 39 in the location of the previous physical rename register 39 corresponding to the previous value of the same architected logical register. This latter step creates a set of linked lists of physical rename registers 39 within the state history buffer corresponding to each of the architected logical registers.

The execution units execute instructions received from the dispatch unit 20 as in the prior art microprocessor 10 of FIG. 1. However, when an execution unit finishes executing an instruction which produces a result, the result is written back to the physical rename register 39 assigned to the instruction by the dispatch unit 20. In addition, the execution unit updates the status bits 52 of the state history buffer 23 to indicate that the result has just been written to the corresponding physical rename register 39.

The completion unit 40 in FIG. 2 behaves quite differently from the completion unit 40 of the prior art shown in FIG. 1. Rather than completing instructions in the program order, the completion unit 40 of FIG. 2 tracks the control flow dependencies of each instruction after it has been dispatched as detailed in co-pending application Ser. No. 08/377,813, filed Jan. 25, 1995, now abandoned. Once an instruction is guaranteed to execute and has acknowledged all of its control dependencies, the instruction is said to be "committed" to the machine state. Once an instruction is committed, the completion unit 40 updates the status bits 52 of the state history buffer 23. Specifically, the physical rename register 39 allocated to store the result from the committed instruction is marked as committed, regardless of whether or not data has been produced yet from the instruction. Thus, instructions are committed by the completion unit 40 out of program order and indeed in some cases prior to data having been written to the physical rename register 39.

Once a physical rename register 39 is marked as committed in the state history buffer 23, then all physical rename registers 39 which correspond to the same architected logical register and predate the committed entry are not necessary for the machine state of the processor. Thus, these physical rename registers 39 have been architecturally written over.

Once a physical rename register 39 is obsolete and is no longer referenced by any instruction, then it can be deallocated and is available for another instruction to use. This can be calculated with simple (high-frequency) control logic. Namely, a 3-bit state machine associated with the status bits 52 of each register in the state history buffer. Each state history register has an allocate, an obsolete, and written-back status bit 52 associated with it. If all three bits are set, then all three should be reset indicating that the corresponding physical rename register 39 is free to be written into. If the allocate bit is set, the corresponding physical rename register 39 is available to be written into. If the written-back bit is set, the corresponding physical rename register 39 contains valid data produced by an execution unit. The obsolete bit is set when a later instance of the instruction, determined by following the linked list in the state history buffer 23, has been committed and when the corresponding physical register 39 is not required as an operand by any other instructions.

FIGS. 3–8 depict an expanded view of a portion of the microprocessor for illustrating an example of the interaction between the dispatch unit 20, the general purpose register 32, the completion unit 40, several fixed point execution units 22, the look ahead state buffer 21, the state history buffer 23, and associated control logic 50. For purposes of the example, the processor has been defined with 4 architected logical registers for use by a programmer to store integer data. These architected logical registers are known to the programmer as R0–R3. The general purpose register 32 implements this function with 8 physical rename registers 39, designated P0–P8. 4 of the physical rename registers 39 at any given time contain the machine state of the processor, namely the committed values of the architected logical registers. The choice of the number of each type of registers is arbitrary. However, the physical rename registers 39 must exceed the number of architected logical registers. The look ahead state buffer 21 contains a set of 4 registers, each corresponding to one the architected logical registers and storing an address indicating one of the physical rename registers 39. The state history buffer 23 contains 8 state history registers and corresponding status bits 52. The 8 state history registers contain a linked list of physical rename register 39 addresses corresponding to the renaming history of each architected logical register.

Pictured above the dispatch unit 20 in an instruction queue 19 is a 6 line program to be executed by the microprocessor. The program will be used to illustrate the interaction between the elements depicted, as the instructions are dispatched and executed in successive cycles. This example applies as well to the other execution units not depicted including the floating point unit 30.

CYCLE 0

The initial state of the processor

Figure 3:
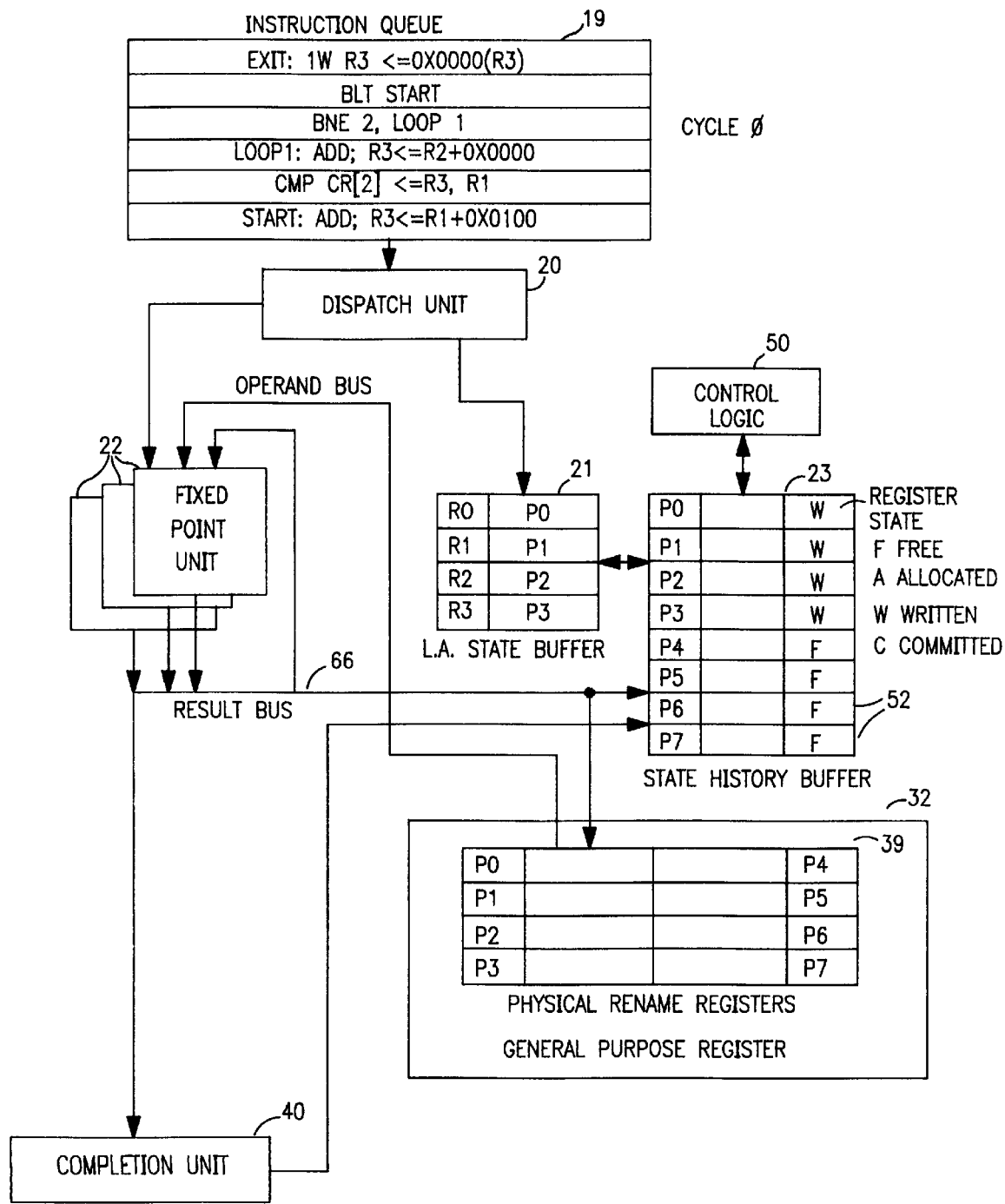
FIGS. 3–8 depict an expanded view of a portion of the microprocessor, executing a simple example program in consecutive processor cycles. The example illustrates the interaction between the dispatch unit, the general purpose register, the completion unit, several execution units, the look ahead state buffer, the state history buffer, and associated control logic.

FIG. 3 depicts cycle 0 in the example. No instruction in the program sequence has yet been dispatched. The initial state of the processor, indicated by the look ahead state buffer 21, shows that the architected logical registers R0–R3 have values stored at the addresses of physical rename registers P0–P3, respectively indicating. The state history buffer indicates via status bits 52 that the physical rename registers P0–P3 contain written entries, and hence valid data.

CYCLE 1 addi instruction is dispatched

Figure 4:
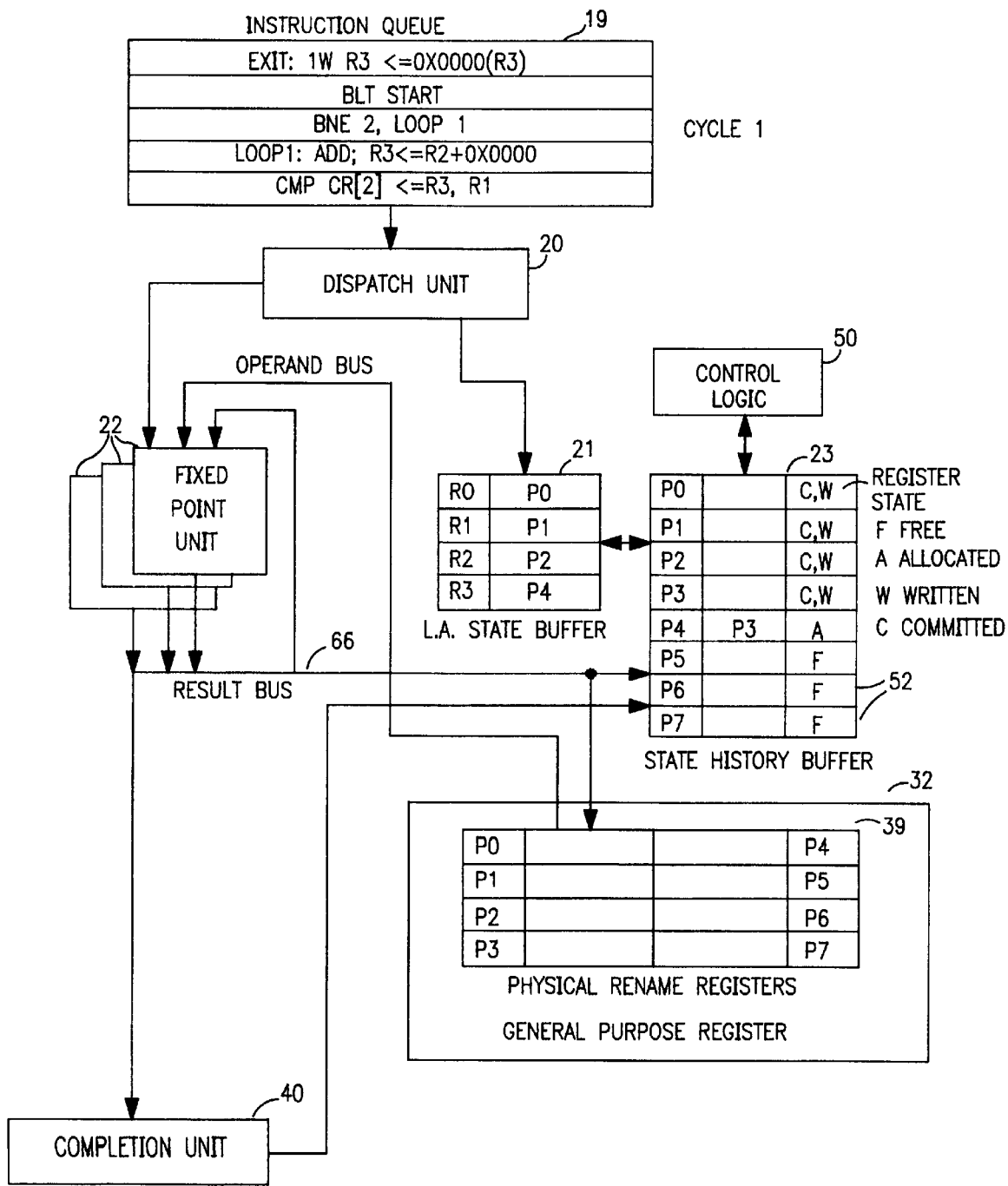

FIG. 4 depicts cycle 1. When the add instruction is dispatched to an execution unit from the dispatch unit 20, R3 is renamed the architected logical register since that is the target for the result from this instruction. The first available physical rename register P4 is used for the rename operation. Note, however, that the choice of P4 is arbitrary. Any of registers P4–P7 could have been used. P4 is selected by the dispatch unit 20, based on the status bits corresponding to P4 in the state history buffer indicating a "free" register. The dispatch unit sets the status bits 52 corresponding to P4 to the allocated state and stores the previous valid address P3 (read from the look ahead state buffer 21) in the address field of location P4 in the state history buffer 23.

This instance of the add instruction dispatched to an execution unit then becomes: addi P4≦P1+0x0000, based on the original: addi R3≦R1+0x0000.

CYCLE 2 cmp and addi instructions are dispatched

Figure 5:
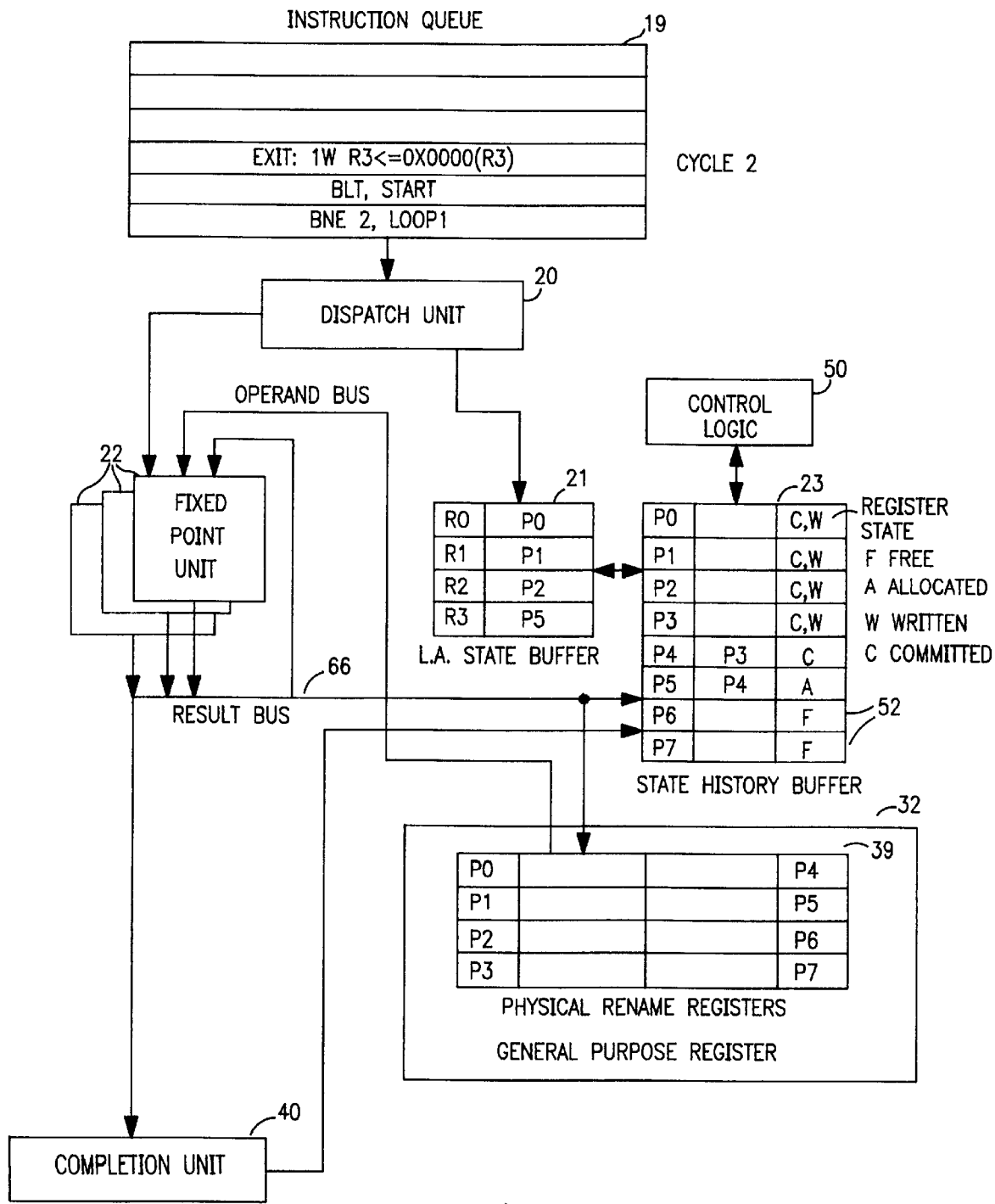

FIG. 5 depicts cycle 2 of the processor. Two instructions, the cmp and addi instructions are dispatched to diverse execution units for execution. When dispatching the cmp instruction, the dispatch unit assigns the current physical rename registers 39 assigned to architected logical registers R3 and R1 respectively. The dispatched compare instruction becomes:

cmp CR [2]≦P4, P1 based on the original: cmp CR [2]≦R3, R1.

The addi instruction specifies the target architected logical register R3 again to store the result of the instruction. Thus, the dispatch unit 20 renames the current physical register P4 assigned to architected logical register R3. The status bits 52 of the state history buffer 23 are checked for the first free physical rename register 39, which is P5. Thus, P5 is used by the dispatch unit 20 to rename architected logical register R3. P5 is stored in the look ahead state buffer 21 at location R3, and P4 is stored in the state history buffer 23 at the location P5, creating a linked list of physical rename registers 39 previously assigned to architected logical register R3. Furthermore the dispatch unit 20 updates the status bits 52 in the state history buffer 23 corresponding to P5 to indicate that physical rename register P5 has been allocated. The dispatched add instruction then becomes:

addi P5≦P2+0x0000 based on the original: addi R3≦R2+0x0000.

Also in this cycle, the completion unit 40 signals that addi has competed and may be committed to the machine state. Note that addi has not created a result yet.

CYCLE 3

The bne and blt instructions are dispatched

Figure 6:
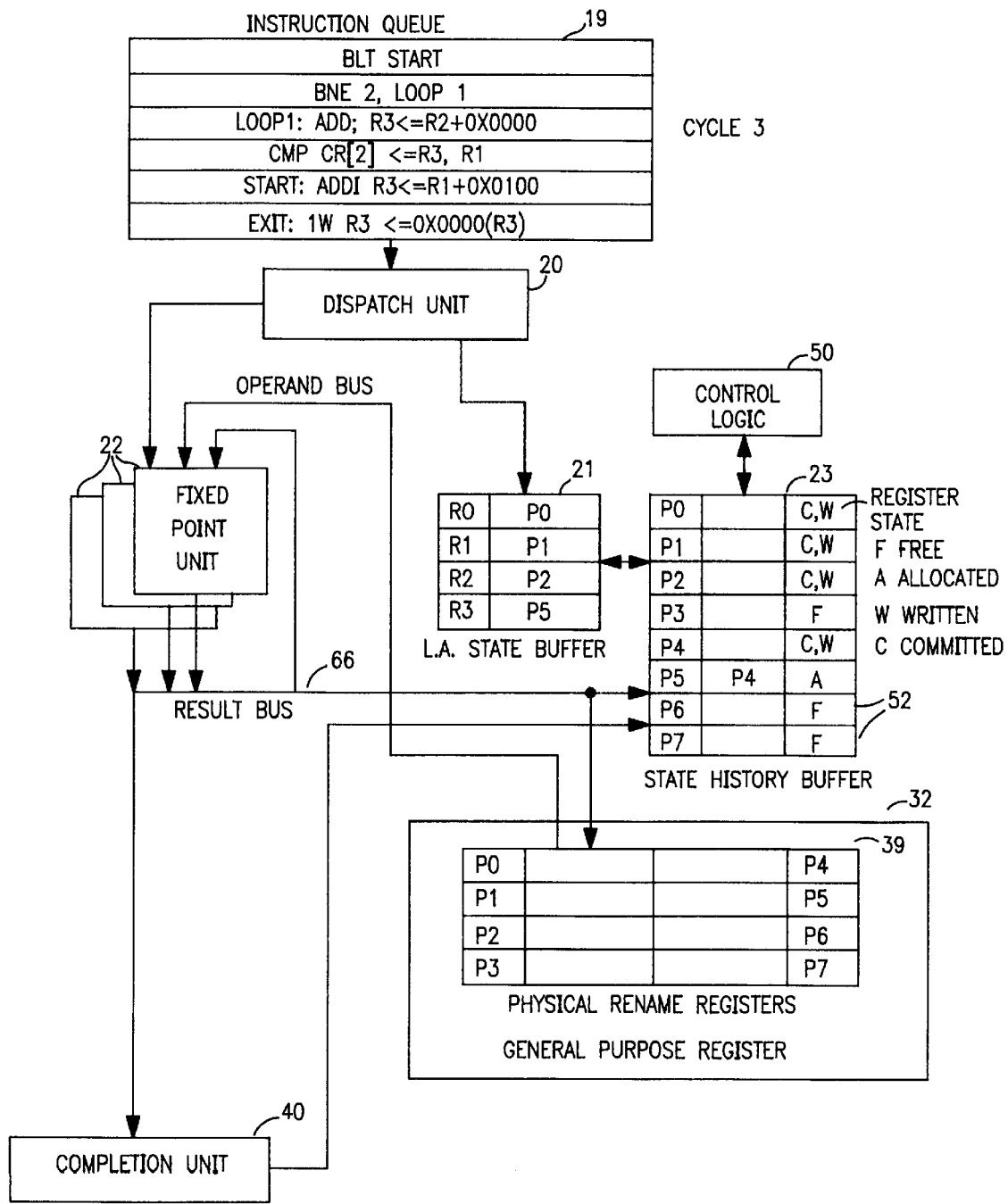

Cycle 3 is depicted in FIG. 6. The bne and blt instructions have no direct effect on the look ahead state or the State History Buffer. In this example, the branch processing unit 18 predicted that the blt branch would be taken back to location "Start." Thus, it is evident that the addi instruction at location Start, and subsequent instructions, have entered the instruction queue. For simplicity sake, it is assumed that the branch predicted correctly and that the instruction sequence in the instruction queue 19 will continue to execute. However, the lw instruction at location Exit will not be dispatched because the program branch taken occurred prior to it.

Also during this cycle, the control logic associated with the state history buffer 23 detects that P4 is committed this cycle, so that P3, an earlier instance of the architected logical register R3 is now obsolete. Therefore, the status bits 52 of P4 are set to the free state, and P4 no longer has a valid predecessor. The addi instruction also writes its result during this cycle to physical rename register P4. Therefore the utilized execution unit sets the P4 status bits 52 in the state history buffer to written.

CYCLE 4

The addi, cmp, and addi. instructions are dispatched

Figure 7:
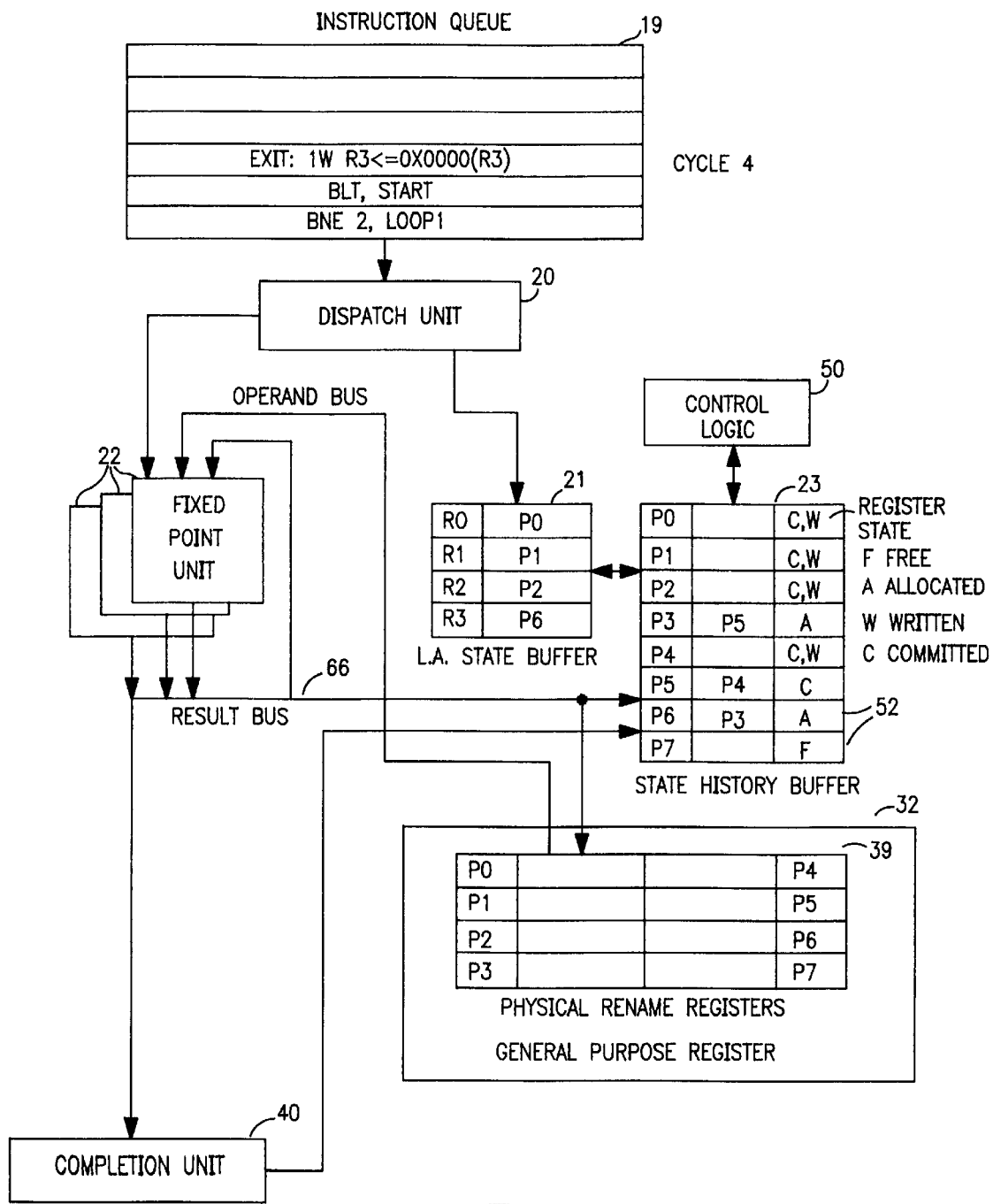

Cycle 4 is depicted in FIG. 7. During this cycle, two addi instructions and one cmp instruction are dispatched in parallel to diverse execution units for simultaneous execution. Each of the addi instructions will produce a result for the architected logical register R3, and the cmp instruction will use the contents of the architected logical register R3 as an operand. The dispatch unit 20 must account for dependencies among instructions being dispatched in parallel. Well known methods exist for this.

The first addi instruction in the program sequence will rename the target architected logical register from the current physical rename register P5 to the first available rename register P3, which was in the free state. The dispatch unit will store the old physical rename register address P5 in the state history buffer at the location of the new physical rename register P3. Further, the dispatch unit will update the status bits 52 of the new physical rename register location, in the state history buffer to the allocated state. When the first addi instruction is dispatched to an execution unit, it becomes:

addi P3≦P1+0x0000, based on the original: addi R3≦R1+0x0000.

The next instruction in the instruction sequence, amp, does not require one of the architected logical registers R0-R3 to store a result. However, the cmp does require architected logical registers for operands. Thus, the operands in the instruction are renamed to the physical rename registers that currently represent the needed architected logical registers, as indicated in the look ahead state buffer 21. Hence, when the camp instruction is dispatched to an execution unit, it becomes:

cmp CR[2]≦P3, P1, based on the original: cmp CR [2]≦R3, R1.

The last instruction in the sequence of three being simultaneously dispatched to diverse execution units is the addi instruction. This instruction requires the architected logical register R3 for storing the result of the instruction. The dispatch unit 20 will rename the architected logical register R3 with the first available physical rename register 39. This is determined to be P6 based on the status bit in the state history buffer 23. The address of P6 will be stored in the look ahead state buffer 21. Furthermore, the address of the former physical rename register assigned to the architected logical register R3, namely P3, will be stored in the state history buffer 23 at the location P6. Thus a linked list of physical rename registers 39 corresponding to the architected logical register R3 will be stored in the state history buffer 23. The dispatch unit 20 will also update the status bits 52 corresponding to P6 in the state history buffer 23 to indicate that the physical rename register P6 has been allocated.

When the addi instruction is dispatched to an execution unit, it becomes:

addi P6≦P2+0x0000, based on the original: addi R3≦R2+0x0000.

The addi instruction is committed this cycle by the completion unit and the status bits in the state history buffer 23 reflect this.

CYCLE 5

Figure 8:
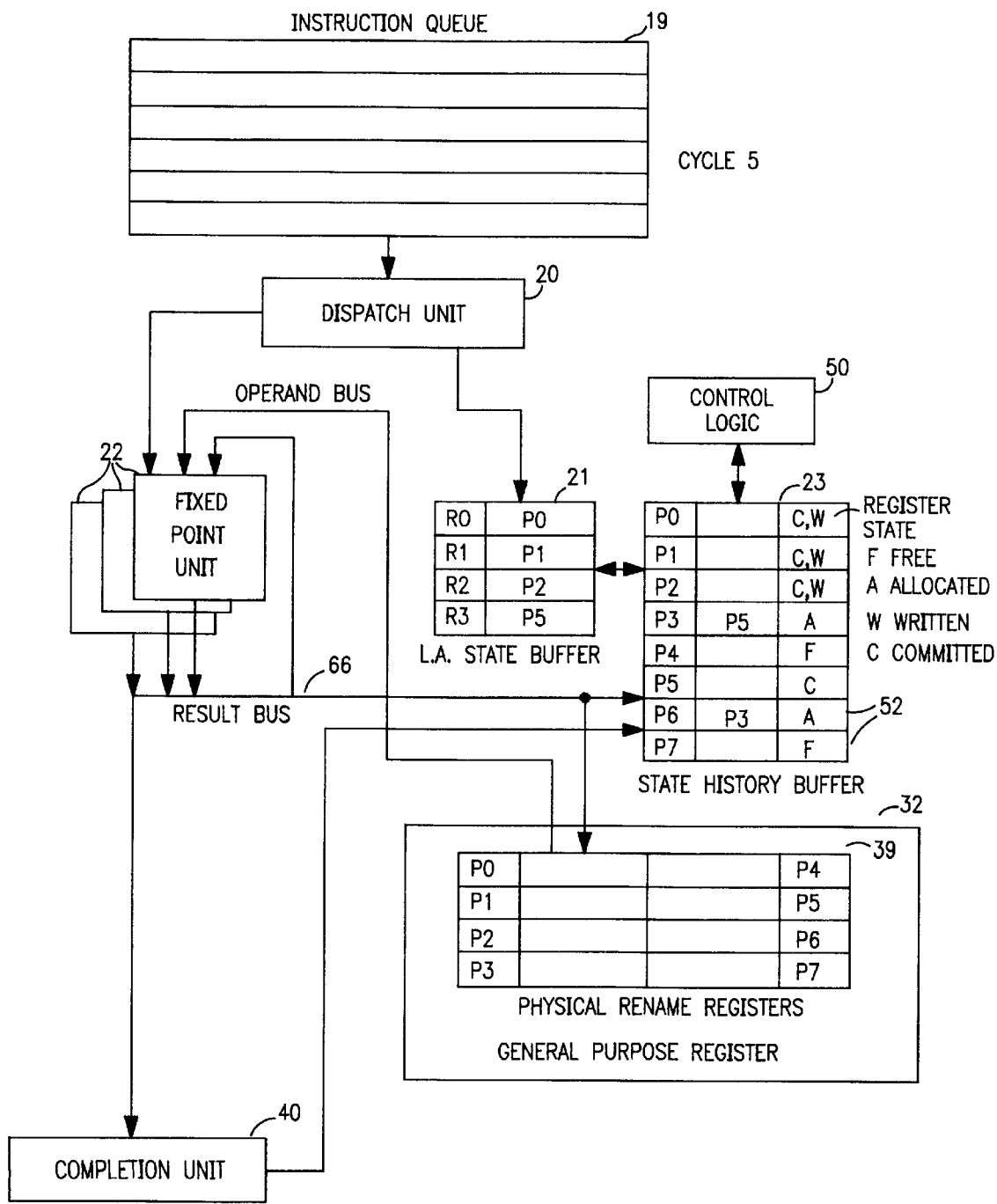

An interrupt is signaled—the look ahead state must be recovered to generate the correct machine state Cycle 5 is depicted in FIG. 8. The control logic 50 coupled to the state history buffer 23 determines that physical rename register P5 is committed this cycle, based on its status bits 52. P4, being a predecessor, is now obsolete. The status bits 52 of P4, therefore, are set to the free state. P5 no longer has a valid predecessor.

When the interrupt is signalled, the look ahead state buffer 21 must be reset to the committed machine state. In order to do this, the state history buffer 23 is used. R3 is currently set to P6 in the look ahead state buffer 21. However, in order to determine the machine state of the architected logical register R3, the linked list in the state history buffer 23 associated with R3 must be followed to find the earliest committed physical rename register 39. The linked list in the state history buffer corresponding to R3 is:

$$R3 \geq P6 \geq P3 \geq P5.$$

This progression is evident from the contents of the state history buffer 23. P5 is the earliest committed entry in the state history buffer. Thus, R3 should be set to P5 in the look ahead state buffer 21, in order to indicate that physical rename register P5 contains the value committed to the machine state for architected logical register R3.

Although specific embodiments of the invention have been disclosed, it will be understood by those having skill in the art that changes can be made to those specific embodiments without departing from the spirit and scope of the invention.

What is claimed is:

1. A superscaler processor having an apparatus for managing data-flow dependencies arising from out-of-order execution, by an execution unit, of an instruction series input from an instruction source, the apparatus comprising:

a plurality of physical rename registers, coupled to said execution unit and having addresses, storing results produced during execution of an instruction series;

a look ahead state buffer, coupled to said physical rename registers, storing said addresses of said physical rename registers, indicating current assignments to architected logical registers specified in said instruction series;

a state history buffer, coupled to said look ahead state buffer, for storing a plurality of linked lists of said addresses of said physical rename registers successively assigned to each of said architected logical registers in said look ahead state buffer, said state history buffer having changeable status bits indicating when each of said plurality of physical rename registers is free, allocated written, and committed; and control logic, coupled to said state history buffer, resetting said status bits, corresponding to a physical rename register, to the free state in response to a successor entry, in one of said plurality of linked lists in said state history buffer, having status bits indicating committed.

2. The apparatus according to claim 1, further comprising:

a dispatch unit, coupled to said instruction source, said state history buffer, and said look ahead state buffer, said dispatch unit determining a free physical rename register based on said status bits, allocating said free physical rename register to an instruction specifying an architected logical register for storing a result, storing an address of said free physical rename register in said look ahead state buffer, and dispatching instructions.

3. The apparatus according to claim 2, wherein:

said execution unit is coupled to said dispatch unit, to said rename registers, and to said state history buffer, said execution unit receiving and executing said instructions from said dispatch unit, writing results from said instructions into said plurality of physical rename registers, and updating said status bits indicating when each of said plurality of physical rename registers has been written.

4. The apparatus according to claim 3, further comprising:

a completion unit, coupled to said state history buffer and to said execution unit, determining when a result produced by an instruction can be committed to one of said plurality of architected logical registers, and updating said status bits when said data is committed.

5. The apparatus according to claim 4, further comprising control logic, coupled to said state history buffer, resetting said status bits when committed data in one of said plurality of physical rename registers becomes obsolete.

6. The apparatus according to claim 1, wherein:

said execution unit is coupled to said dispatch unit, to said physical rename registers, and to said state history buffer, said execution unit receiving and executing said instructions from said instruction series, writing results from said instructions into said plurality of physical rename registers, and updating said status bits indicating when each of said plurality of physical rename registers has been written.

7. The apparatus according to claim 1, further comprising a completion unit, coupled to said execution unit, determining when a result produced by an instruction in said instruction series can be committed to one of said plurality of architected logical registers, and updating said status bits when said data is committed.

8. The apparatus according to claim 2, wherein said dispatch unit updates said status bits in response to allocating said free physical rename register.

9. A method for managing data-flow dependencies arising from our-of-order execution of an instruction series in a superscaler processor, the method comprising the steps of:

assigning physical rename registers to architected logical registers specified in an instruction series;

storing results produced during execution of said instruction series in said physical rename registers;

tracking the history of assignments of said physical rename registers to each of said architected logical registers using a linked list of successive assignments of said physical rename registers associated with each of said architected logical registers;

determining when a result produced by an instruction of said instruction series can be committed to one of said plurality of architected logical registers; and indicating, using status bits, when each of said plurality of physical rename registers is free, allocated written and committed.

10. The method according to claim 9, further comprising the steps of:

determining a free physical rename register based on said status bits;

allocating said free physical rename register to an instruction specifying one of said architected logical registers for storing a result;

storing said address of said free physical rename register in a look ahead state buffer; and dispatching instructions for execution.

11. The method according to claim 9, wherein the step of storing results occurs in response to at least one execution unit executing instructions and producing results from said instruction series.

* * * * *

UNITED STATES PATENT AND TRADEMARK OFFICE
CERTIFICATE OF CORRECTION

PATENT NO. : 5,872,949
DATED : February 16, 1999
INVENTOR(S) : Betty Yooko Kikuta, Terence Matthew Potter It is certified that error appears in the above-identified patent and that said Letters Patent is hereby corrected as shown below:

Column 8, line 14, "amp" should read --cmp--.

Column 10, line 30, "our-of-order" should read --out-of-order--.

Signed and Sealed this

Twenty-seventh Day of July, 1999

Attest:

Q. TODD DICKINSON

*Attesting Officer*   Acting Commissioner of Patents and Trademarks